United States Patent Office 3,631,192
Patented Dec. 28, 1971

3,631,192
HYDROSILYLALKYL ALUMINUMS
Keith W. Michael, Midland, Mich., assignor to Dow Corning Corporation, Midland, Mich.
No Drawing. Filed Feb. 13, 1970, Ser. No. 11,327
Int. Cl. C07g 5/06
U.S. Cl. 260—448 A                        1 Claim

ABSTRACT OF THE DISCLOSURE

Compounds of the formula $$R_xAl\{C_2H_4(R')_ySiR''_aH_{3-a}\}_{3-x}$$

are prepared by reacting trialkyl aluminum compounds with $CH_2=CH(R')_ySiR''_aH_{3-a}$ in an inert atmosphere at a temperature of from 100 to 150° C. For example, triisobutyl aluminum is reacted with vinylmethylsilane in helium at 120° C. to give $(iC_4H_9)_2AlC_2H_4Si(CH_3)H_2$. The compounds are useful as intermediates in the preparation of carboxyalkyl silicon compounds and alkenylsilanes and can be used as water repellants.

---

The uniqueness of the compositions of this invention lies in the fact that they have an aluminum atom attached to carbon and a hydrogen atom attached to silicon all in the same molecule.

Compositions of this invention are useful as intermediates in the preparation of carboxyalkyl silicon compounds of the type shown in U.S. Pat. 2,723,987. In addition, the compositions of this invention are useful in the preparation of carboxyalkyl silicon compounds having hydrogen attached to the silicon. These cannot be made by the method of the aforesaid patent because the only way carboxyalkyl compositions are prepared therein is by the hydrolysis of corresponding esters with alkali. This procedure removes any silicon-bonded hydrogen. However, the method of this invention affords easy preparation of carboxyalkyl silicon compounds having hydrogen attached directly to the silicon.

The preparation of carboxyalkyl compounds from the compositions of this invention is carried out by the addition of carbon dioxide to the aluminum compounds as shown by Zeiss "Organic Metallic Chemistry," pages 240–241, which is hereby incorporated into this application by reference. Briefly, the method involves reacting the aluminum compound with carbon dioxide in an inert solvent followed by the reaction of the product with the dilute hydrochloric acid.

The compounds of this invention are also useful in the preparation of alkenylsilanes. This can be done by adding excess ethylene to the aluminum compounds in accordance with the method shown in the Zeiss reference supra, pages 220–231. The utility of such alkenyl silanes are well known such as, for example, the utility shown in U.S. Pat. 3,223,686. This method is particularly valuable for preparing higher alkenyl silanes, that is those containing say from 6 to 25 or more carbon atoms, from lower alkenyl silanes such as vinylsilane or allylsilane. In other words, one could prepare the aluminum compounds for this invention starting with a vinylsilane and then say adding to this 4 mols of ethylene per mol of aluminum compound and thereafter heating the product above 200° to produce decenylsilanes.

Finally, the compositions of this invention can be used per se as water repellents.

This invention relates to compounds of the formula $R_xAl\{C_2H_4(R')_ySiR''_aH_{3-a}\}_{3-x}$ in which R is $R'''_3SiO—$, a monovalent hydrocarbon radical of at least 2 carbon atoms, or a halogen atom, R''' is a monovalent hydrocarbon radical, R' is a divalent hydrocarbon radical of from 1 to 30 carbon atoms, y is 0 or 1, R'' is a monovalent hydrocarbon radical, R, R', R'' and R''' all being free of aliphatic unsaturation and each containing no more than 30 carbon atoms, x is 0 to 2 and a is 0 to 2.

The compounds of this invention are best prepared by reacting aluminum alkyls with the corresponding alkenylsilane at temperatures of about 120° C. in an inert atmosphere and in a hydrocarbon solvent. The basic reaction can be illustrated by the equation $$R_3Al+CH_2=CH(R')_ySiR''_aH_{3-a} \rightarrow \text{olefin} + R_xAl\{C_2H_4(R')_ySiR''_aH_{3-a}\}_{3-x}$$

The compounds can also be prepared by reacting $R_2AlH$ with the alkenylsilane. This reaction will go at room temperature or slightly above.

Either 1, 2 or 3 of the R groups on the aluminum can be replaced by the alkenylsilane depending upon the mol ratio of aluminum compounds to alkenylsilane and the reaction time. Thus, the compositions of this invention can be of the formulae $R_2AlC_2H_4(R')_ySiR''_aH_{3-a}$, $$RAl\{C_2H_4(R')_ySiR''_aH_{3a-}\}_2 \text{ or}$$

$$Al\{C_2H_4(R')_ySiR''_aH_{3-a}\}_3$$

Those compounds in which R is a trihydrocarbylsiloxy group or a halogen atom, are prepared by reacting the trialkyl aluminum compound with silanes containing a silicon-bonded halogen or with disiloxanes of the formula $$\text{alkenyl Si}\underset{\underset{R''_2}{|}}{-}OSiR'''_3$$

The reaction of a chlorosilane with a trialkyl aluminum causes transfer of the chlorine atom from the silicon to the aluminum and the formation of an SiH bond. By the same token the reaction of a trialkyl aluminum with say vinyltetramethylsiloxane results in the transfer of the trimethylsiloxy group to the aluminum atom and the placing of a hydrogen atom on the silicon attached to the vinyl. These reactions are best carried out with alkyl aluminums having branching in the beta- position such as triisobutyl aluminum.

For the purpose of this invention R can be any hydrocarbon radical of at least 2 carbon atoms which is free of aliphatic unsaturation such as ethyl, butyl, isobutyl, propyl, isopropyl, hexyl or decyl; or any halogen atoms such as chlorine, bromine, iodine or fluorine; or any trihydrocarbyl siloxy group of the formula $R'''_3SiO$ in which R''' is any monovalent hydrocarbon radical free of unsaturation and such as alkyl radical such as methyl, ethyl, propyl, butyl, isopropyl, octadecyl or myricyl; or any aryl radical such as benzyl, beta-phenylethyl or beta-phenylrdaical such as benzyl, beta-phenylethyl or beta-phenylpropyl; or any cycloaliphatic radical such as cyclohexyl, cyclopentyl or methylcyclohexyl.

For this purpose of this invention R' can be any divalent hydrocarbon radical free of aliphatic unsaturation such as alkylene radical such as methylene, dimethylene, tetramethylene, octadeca-methylene, $$-\underset{\underset{CH_3}{|}}{CH}-, \quad -CH_2\underset{\underset{CH_3}{|}}{CH}CH_2-$$

or $—(CH_2)_{25}$, or any arylene hydrocarbon radical such as phenylene, xylene, naphthylene or tolylene; any radical such as $—C_6H_4CH_2CH_2—$ or $$-C_6H_4\underset{\underset{CH_3}{|}}{CH}CH-$$

or any cycloaliphatic radical such as cyclohexylene, cyclopentylene or methylcyclohexylene.

For the purpose of this invention R'' can be any monovalent hydrocarbon radical free of aliphatic unsaturation such as alkyl radical such as methyl, ethyl, butyl, isobutyl, octadecyl or myricyl; or any aryl hydrocarbon radical such as phenyl, tolyl or xenyl; or any cycloaliphatic hydrocarbon radical such as cyclohexyl, cyclopentyl or methylcyclohexyl.

The following examples are illustrative only and should dure of Example 1, the following products are obtained. The abbreviations used are Me for methyl, Et for ethyl, iBu for isobutyl and Ph for phenyl.

| Aluminum alkyl | Silane | Product |
|---|---|---|
| Et$_3$Al | CH$_2$=CHSiH$_3$ | EtAl{MeCHSiH$_3$}$_2$ and Et$_2$AlCH$_2$CH(Et)SiH$_3$ |
| (C$_8$H$_{17}$)$_3$Al | CH$_2$=CHCH$_2$SiH$_2$Ph | C$_8$H$_{17}$Al{(CH$_2$)$_3$SiH$_2$Ph}$_2$ |
| iBu$_3$Al | CH$_2$=CH(CH$_2$)$_{25}$Si(C$^1{}_8$H$_{37}$)H$_2$ | Al{(CH$_2$)$_{27}$Si(C$_{18}$H$_{37}$)H$_2$}$_3$ |
| iBu$_3$Al | CH$_2$=CHCH$_2$Si(C$_6$H$_{11}$)H$_2$ | iBu$_2$Al(CH$_2$)$_3$Si(C$_6$H$_{11}$)H$_2$ |
| iBu$_3$Al | CH$_2$=CHCH$_2$SiH$_2$(CH$_2$CH$_2$Ph) | Al{(CH$_2$)$_3$SiH$_2$(CH$_2$CH$_2$Ph)}$_3$ |
| iBu$_3$Al | CH$_2$=CH—⟨O⟩—SiMe$_2$H | iBu$_2$AlCH$_2$CH$_2$—⟨O⟩—SiMe$_2$H |
| iBu$_3$Al | CH$_2$=CH—⟨O⟩—CH$_2$CH$_2$SiMe$_2$H | Al(CH$_2$CH$_2$—⟨O⟩—CH$_2$CH$_2$SiMe$_2$H)$_3$ |
| iBu$_3$Al | CH$_2$=CH—⟨S⟩—SiH(C$_6$H$_4$Me)$_2$ | iBu$_2$AlCH$_2$CH$_2$—⟨S⟩—SiH(C$_6$H$_4$Me)$_2$ |
| iBu$_3$Al | CH$_2$=C(CH$_3$)CH$_2$SiHMe$_2$ | iBu$_2$AlCH$_2$CH(CH$_3$)CH$_2$SiHMe$_2$ | not be construed as limiting the invention which is properly delineated in the appended claims.

EXAMPLE 1

A dry flask was purged with helium and charged with 0.013 mol of triethyl aluminum in 7.2 ml. of toluene and 9 ml. of 8-dimethylsilyloctene-1. The mixture was heated at 110–130° C. for a period of 172 hours and the toluene was allowed to escape through the helium system. Analysis of the product by infrared and nuclear magnetic resonance showed that the product was a mixture of {(CH$_3$)$_2$HSi(CH$_2$)$_8$}$_3$Al and {(CH$_3$)$_2$HSi(C$_{10}$H$_{20}$)}$_3$Al.

EXAMPLE 2

A dry flask was purged with helium, charged 6.7 ml. of triisobutyl aluminum and 20 ml. of 8-dimethylsilyloctene-1, and was heated for 1½ hours at 75 to 85° C. and then at 115 to 125° C. for 20 hours. Analysis of the product by infrared and nuclear magnetic resonance showed that the product was Al{(CH$_2$)$_8$SiH(CH$_3$)$_2$}$_3$.

EXAMPLE 3

A dry flask which had been purged with helium was charged with 8 ml. of triisobutyl aluminum and 7.5 ml. of 8-dimethylchlorosilyloctene-1. The mixture was heated at 85 to 105° C. and the product obtained was shown by infrared analysis and nuclear magnetic resonance to be (CH$_3$)$_2$CHCH$_2$(Cl)Al(CH$_2$)$_8$SiH(CH$_3$)$_2$.

EXAMPLE 4

A dry flask was purged with helium and charged with 5 ml. of triisobutyl aluminum and 6.2 ml. of 1-octenylpentamethyldisiloxane. The mixture was stirred and heated at 120° C. for 2 hours. Analysis of the mixture by a nuclear magnetic resonance and by infrared showed that the product was (CH$_3$)$_3$SiO{(CH$_3$)$_2$CHCH$_2$}Al(CH$_2$)$_8$SiH(CH$_3$)$_2$

EXAMPLE 5

When the following aluminum alkyls are reacted with the following alkenylsilanes in accordance with the procedure of Example 1, the following products are obtained.

That which is claimed is:
1. A compound of the formula

R$_x$Al{C$_2$H$_4$(R')$_y$SiR''$_a$H$_{3-a}$}$_{3-x}$ in which
R is a monovalent hydrocarbon radical of at least 2 carbon atoms, free of aliphatic unsaturation, a halogen atom or a radical of the formula R'''$_3$SiO— in which
   R''' is a monovalent hydrocarbon radical free of aliphatic unsaturation,
R' is a divalent hydrocarbon radical free of aliphatic unsaturation,
R'' is a monovalent hydrocarbon radical free of aliphatic unsaturation,
R, R', R'' and R''' each containing no more than 30 carbon atoms,
$y$ is 0 or 1,
$x$ is 0 to 2, and
$a$ is 0 to 2.

References Cited

UNITED STATES PATENTS

| 2,897,220 | 7/1959 | Jenkner | 260—448 A |
| 3,004,053 | 10/1961 | Shiihara et al. | 260—448.2 |
| 3,223,686 | 12/1965 | Natta et al. | |
| 3,322,807 | 5/1967 | Johnson | 260—448.2 |
| 3,444,227 | 5/1969 | Roberts et al. | 260—448 R |

OTHER REFERENCES

Chemical Abstracts, Vol. 53, p. 21666h (1959).
Chemical Abstracts, Vol. 57, pp. 11226i–11227d (1962).

TOBIAS E. LEVOW, Primary Examiner
H. M. S. SNEED, Assistant Examiner

U.S. Cl. X.R.
117—139.5; 252—8.6; 260—448.2 B